United States Patent [19]

Bowes

[11] 4,319,802
[45] Mar. 16, 1982

[54] STAIN RELIEF FOR FIBER OPTIC CONNECTORS

[75] Inventor: Kenneth F. Bowes, Danbury, Conn.

[73] Assignee: Bunker Ramo Corporation, Oak Brook, Ill.

[21] Appl. No.: 86,199

[22] Filed: Oct. 17, 1979

[51] Int. Cl.³ .............................................. G02B 7/26
[52] U.S. Cl. ............................. 350/96.20; 350/96.23
[58] Field of Search ............. 350/96.20, 96.21, 96.22, 350/96.23; 339/103 R, 103 B, 103 C, 103 M, 258 R, 258 A, 276 T

[56] References Cited

U.S. PATENT DOCUMENTS

| | | | |
|---|---|---|---|
| 3,624,591 | 11/1971 | Buberniak | 339/103 R |
| 3,792,284 | 2/1974 | Kaelin | 350/96.20 X |
| 3,883,681 | 5/1975 | Campbell | 350/96.20 X |
| 3,904,269 | 9/1975 | Lebduska et al. | 350/96.22 |
| 3,922,064 | 11/1975 | Clark et al. | 350/96.22 |
| 3,946,467 | 3/1976 | Lukas et al. | 350/96.20 X |
| 3,947,088 | 3/1976 | French | 350/96.20 |
| 3,982,060 | 9/1976 | Avery et al. | 350/96.20 X |
| 3,990,779 | 11/1976 | McCartney | 350/96.21 |
| 4,047,797 | 9/1977 | Arnold et al. | 350/96.21 |
| 4,095,872 | 6/1978 | Stieff et al. | 350/96.20 X |
| 4,133,601 | 1/1979 | Le Guen et al. | 350/96.21 |
| 4,140,366 | 2/1979 | Makuch et al. | 350/96.22 |
| 4,168,109 | 9/1979 | Dumire | 350/96.22 |
| 4,185,886 | 1/1980 | Corrales | 350/96.21 |

FOREIGN PATENT DOCUMENTS

| | | | |
|---|---|---|---|
| 3092 | 7/1979 | European Pat. Off. | 350/96.21 |
| 2611108 | 9/1977 | Fed. Rep. of Germany | |
| 2614033 | 10/1977 | Fed. Rep. of Germany | |
| 2808651 | 8/1978 | Fed. Rep. of Germany | |
| 2844744 | 4/1979 | Fed. Rep. of Germany | 350/96.21 |
| 2906709 | 8/1979 | Fed. Rep. of Germany | 250/96.21 |
| 2382706 | 9/1978 | France | 350/96.21 |

OTHER PUBLICATIONS

Harper et al., "Fiber-Optic Connector", *IBM Tech. Disclosure Bull.*, vol. 21, No. 5, Oct. 1978, pp. 2115-2116.

*Primary Examiner*—John D. Lee
*Attorney, Agent, or Firm*—Dale A. Kubly; John R. Hoffman

[57] ABSTRACT

A device for providing strain relief for a cable extending into a connector. The device includes a body having a cable receiving opening extending therethrough and having structure for securing the cable substantially about the periphery thereof. The securing structure restrains the cable against rearward movement and is movable from an inoperative position to an operative position. The device further includes structure for moving the securing structure from the inoperative position to the operative position and structure independent of the securing structure for maintaining the securing structure in the operative position. With these features of construction, a fiber optic cable having an optical fiber terminated in a fiber optic connector can be provided with strain relief utilizing the device.

39 Claims, 3 Drawing Figures

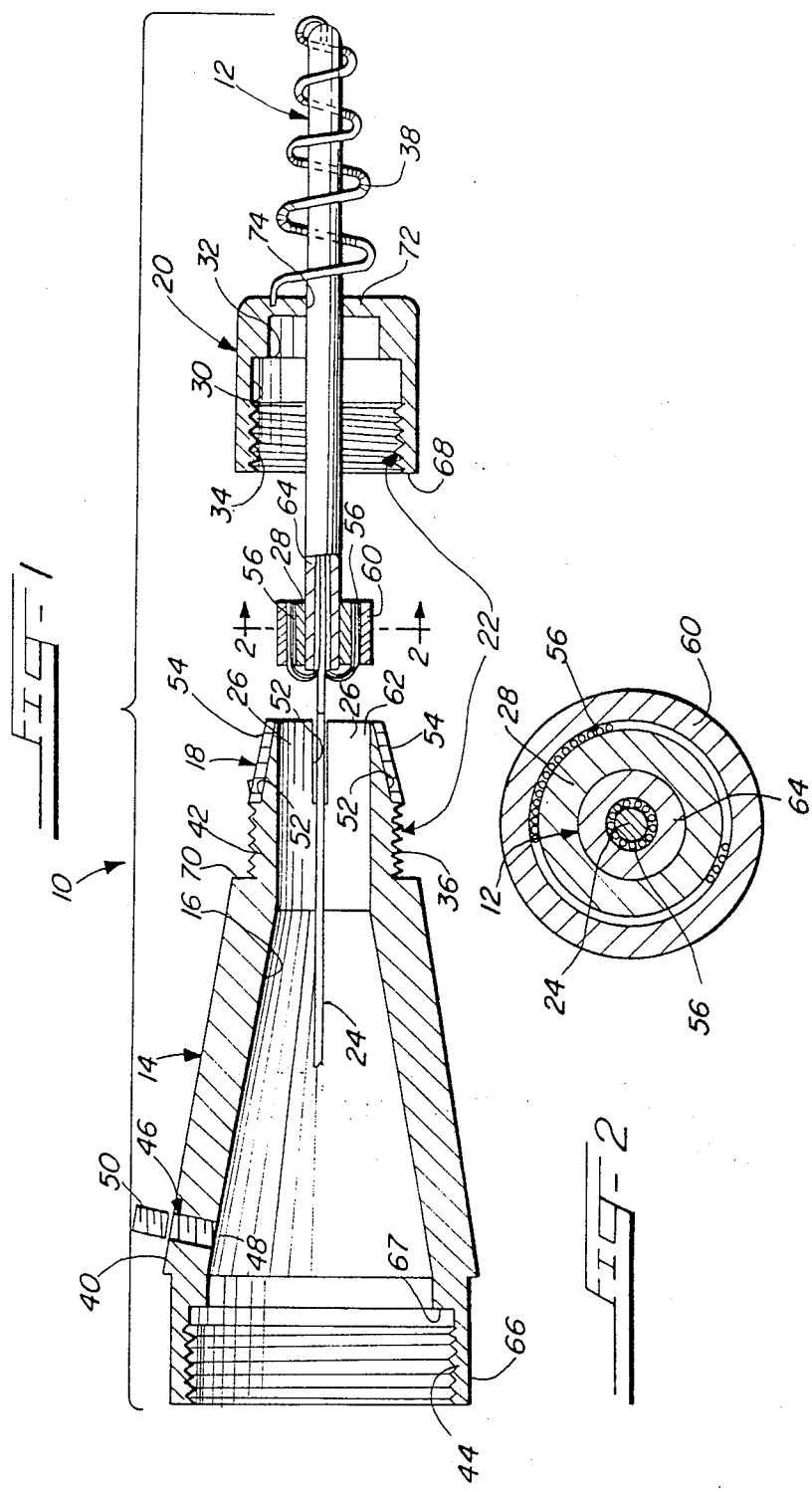

STAIN RELIEF FOR FIBER OPTIC CONNECTORS

BACKGROUND OF THE INVENTION

The present invention relates to a strain relief device and, more particularly, to a device for providing strain relief for a cable extending into a connector.

It has long been recognized that some type of strain relief device is desirable or even necessary to secure a cable extending into a connector. Otherwise, strain imposed on the cable due to applied tension or other severe movement may impair the connection of the cable within the connector or entirely separate the cable from the connector. Therefore, a wide variety of strain relief devices have been devised for use in conjunction with cables extending into connectors.

While strain relief devices have been utilized to secure conductors terminated in electrical connectors, more recent technological developments have indicated significant need in the area of fiber optics. The development of fiber optic communication lines made up of optically-conductive fibers arranged to form a flexible cable for conveying light from one location to another has led to increasing use in recent years. The applications have varied although one particularly significant application has been conveying data from one location to another by modulating a light source with data to be transmitted at one end of the cable and recovering the data at the other end of the cable by a photo-sensitive detector. Since the data is conveyed by a medium not subject to radio frequency interference or detection, fiber optic communication lines are particularly well adapted for applications requiring a high degree of security like those found in the data processing field.

With the increasing use of fiber optic communication lines, the need developed for strain relief devices capable of providing efficient strain relief to protect the optically-conductive fibers. It has also been found desirable to provide an environmental seal for fiber optic connectors and for the fiber optic cables extending into them for various applications. Although strain relief and environmental seal requirements have been known, the need has remained for a suitable device for providing strain relief for a fiber optic cable having an optical fiber terminated in a fiber optic connector and for providing an environmental seal about the fiber optic cable rearwardly of the optical fiber termination in the fiber optic connector.

While the art of fiber optic connectors is still developing, connector pin assemblies are generally available today for terminating the optical fibers of a cable so that they are concentrically and accurately aligned within accepted tolerances. More recently, there has been a growing interest in, and recognition of the need for, developing suitable strain relief devices for use with fiber optic connectors. This interest has been spawned primarily by the need to protect the optical fibers of a fiber optic cable while at the same time, in some applications, providing an environmental seal. More particularly, strain relief devices have been sought which operate to protect the fiber optic cable against damage caused by strain imposed on the cable by tension or other severe movement. Although strain relief requirements have been known, the need has remained for a strain relief device capable of protecting a fiber optic cable while at the same time providing a good environmental seal.

SUMMARY OF THE INVENTION

Accordingly, the present invention, it its broadest aspect, is directed to a device for providing strain relief for a cable extending into a connector. The device includes a body having a cable receiving opening extending therethrough and having means for securing the cable substantially about the periphery thereof. The securing means restrains the cable against rearward movement and is movable from an inoperative position to an operative position. The device further includes means for moving the securing means from the inoperative position to the operative position and means independent of the securing means for maintaining the securing means in the operative position. With these features of construction, a fiber optic cable having an optical fiber terminated in a fiber optic connector can be provided with strain relief by utilizing the device.

In its broader aspects, moreover, the securing means can include a plurality of fingers which extend rearwardly relative to the body to cooperate with a cable engaging retaining ring and the moving means can include a sleeve having means for biasing the fingers inwardly. Additionally, the maintaining means can include internal threads in the sleeve and external threads on the rearward portion of the body which are threadingly engageable with the internal threads in the sleeves to maintain the securing means in the operative position.

Moreover, in its broader aspects, the device can include means for providing bend relief for the cable rearwardly of the body. The bend relief means preferrably comprises a resilient member providing longitudinal support for the cable. More particularly, the resilient member can suitably be a helical coil spring.

In a more specific embodiment, the device is well suited for providing strain relief for a fiber optic cable having an optical fiber terminated in a fiber optic connector. The device can then include a body having a cable receiving opening extending therethrough and having a forward portion and a rearward portion, the rearward portion suitably including means for securing the fiber optic cable against rearward movement which is movable between an operative position and an inoperative position. The rearward portion of the body also includes means independent of the cable securing means for maintaining the cable securing means in an operative position. The device further includes means for moving the cable securing means between the inoperative position and the operative position, the moving means including means independent of the cable securing means for maintaining the cable securing means in the operative position, the moving means having a cable receiving opening extending therethrough. With these features of construction, the device provides efficient strain relief for the fiber optic cable to protect the optical fiber terminated in the fiber optic connector.

Other features of the more specific embodiment of the device include the body having means associated with the forward portion thereof for securing the body to the fiber optic connector. The body securing means also preferably includes threads on the forward portion of the body threadingly engageable with threads on the fiber optic connector. The body further includes means communicating with the cable receiving opening thereof for inserting a sealant into the body to provide environmental protection. The communicating means suitably includes a threaded fill hole through the forward portion of the body and further includes a threaded plug threadingly engageable with the threaded fill hole.

Still further features of the more specific embodiment of the strain relief device include the cable securing means comprising an extending segment of the rearward portion of the body deflectable inwardly toward the fiber optic cable. The extending segment preferably includes a plurality of longitudinally extending slots defining a plurality of inwardly deflectable fingers. The extending segment further includes a tapered outer surface cooperably engageable by the moving means to cause the rearward portion of the body to deflect inwardly toward the fiber optic cable.

In another aspect, the cable securing means includes an extending tubular segment of the rearward portion of the body. The extending tubular segment preferably has a first minimum internal diameter in the inoperative position and a second, smaller minimum internal diameter in the operative position. The extending tubular segment also preferably includes a tapered outer surface decreasing in diameter in the rearward direction. The moving means is cooperably engageable with the tapered outer surface to cause the minimum internal diameter of the extending tubular segment to change from the first diameter to the second diameter.

Still more particularly, the moving means preferably includes a camming surface for moving the inwardly movable fingers between the inoperative position and the operative position. The camming surface cooperates with the tapered outer surface to cause the minimum internal diameter of the extending tubular segment to change from the first diameter to the second diameter. The camming surface is an internal surface of a camming member, the internal surface being of uniform diameter, and the camming member comprising the moving means.

Still further features of the invention include the maintaining means having means associated with the rearward portion of the body forward of the fingers and means associated with the camming member forward of the camming surface. The means associated with the rearward portion of the body includes external threads and the means associated with the camming member includes internal threads. The internal threads of the camming member are threadingly engageable with the external threads of the rearward portion of the body. The camming surface cooperates with the tapered outer surface to cause the minimum internal diameter of the extending tubular segment to change from the first diameter to the second diameter as the camming member is threaded onto the rearward portion of the body.

In another distinct embodiment, a fiber optic cable having strength members and having an optical fiber terminated in a fiber optic connector can be provided with strain relief by utilizing the device. The device then includes a body having a cable receiving opening extending therethrough and including means for securing the fiber optic cable against rearward movement. The cable securing means is movable between an inoperative position and an operative position. The device further includes means for gripping the strength members of the fiber optic cable. The gripping means cooperates with the cable securing means in the operative position to provide strain relief for the fiber optic cable. The device additionally includes means for moving the cable securing means between the inoperative position and the operative position.

In this embodiment of the invention, the cable securing means cooperates with the gripping means in the operative position to restrain the gripping means against rearward movement. The gripping means preferably includes a retaining ring and a crimp ring with the strength members being crimped between the retaining ring and the crimp ring. The cable securing means preferably includes a rearwardly extending segment of the body which is deflectable inwardly to captivate the gripping means. The rearwardly extending segment preferably includes a plurality of longitudinally extending slots defining a plurality of inwardly deflectable fingers. The fingers have tapered outer surfaces which can be cooperably engaged by the moving means to deflect the fingers inwardly.

Still additional features of this embodiment of the invention include the inwardly deflectable fingers defining a cylindrical opening in the rearwardly extending segment of the body. The opening has a first diameter in the inoperative position and has a second, smaller diameter in the operative position. The moving means cooperably causes the inwardly deflectable fingers to move so the diameter of the opening changes from the first diameter to the second diameter.

More particularly, the fingers have tapered inner surfaces forward of the cylindrical opening diverging forwardly away from the cylindrical opening. The cylindrical opening is adapted to receive the crimp ring in the inoperative position and, preferably, at least one of the crimp ring and retaining ring has a tapered outer surface diverging forwardly away from the cylindrical opening. The crimp ring is suitably initially uniformly cylindrical in cross section with the retaining ring being uniformly cylindrical in cross section along at least a portion of its length. The retaining ring is suitably uniformly cylindrical in cross section along the portion of its length coextensive with the crimp ring and is at least as long as the crimp ring. The retaining ring preferably has a tapered outer surface along the forwardly extending portion thereof which diverges forwardly away from the crimp ring. With these features of construction, the tapered outer surface of the retaining ring cooperates with the tapered inner surfaces of the fingers, and surfaces defining the cylindrical opening cooperate with the crimp ring in the operative position to prevent rearward movement of the crimp ring, retaining ring and fiber optic cable relative to the body.

Still more particularly, the moving means includes a camming surface for moving the fingers between the inoperative position and the operative position. The camming surface is cooperably engageable with the tapered outer surfaces of the fingers to cause the diameter of the opening to change from the first diameter to the second diameter. The camming surface is preferably an internal surface of a camming member, the internal surface being of uniform diameter, the camming member comprising the moving means, with the body and the moving means including means for maintaining the cable securing means in an operative position. The maintaining means includes external threads on the body and internal threads in the camming member, with the internal threads of the camming member being threadingly engageable with the external threads of the body. With these features the camming surface can cooperate with the tapered outer surfaces to cause the fingers to tightly engage the gripping means.

The present invention is therefore directed in its broadest sense to a device for providing strain relief for a cable extending into a connector. This is accomplished in a device well suited for providing strain relief for a fiber optic cable having an optical fiber terminated in a fiber optic connector and, in a specific embodiment, for a fiber optic cable having strength members as well. Other objects and advantages of the present invention will be appreciated from a consideration of the details of construction and operation set forth in the accompanying specification, claims and drawings.

BRIEF DESCRIPTION OF THE DRAWINGS

The features of the invention which are believed to be novel are set forth with particularity in the appended claims. The invention, together with the further objects and advantages thereof, may best be understood by reference to the following description taken in conjunction with the accompanying drawings. In the drawings, like reference numerals identify like elements in the several figures in which:

FIG. 1 is a cross-sectional view of the strain relief device constructed in accordance with the present invention with the various structural elements disassembled for clarity;

FIG. 2 is a cross-sectional view taken on the line 2—2 of FIG. 1; and

DETAILED DESCRIPTION OF THE PREFERRED EMBODIMENT

Figure 3:
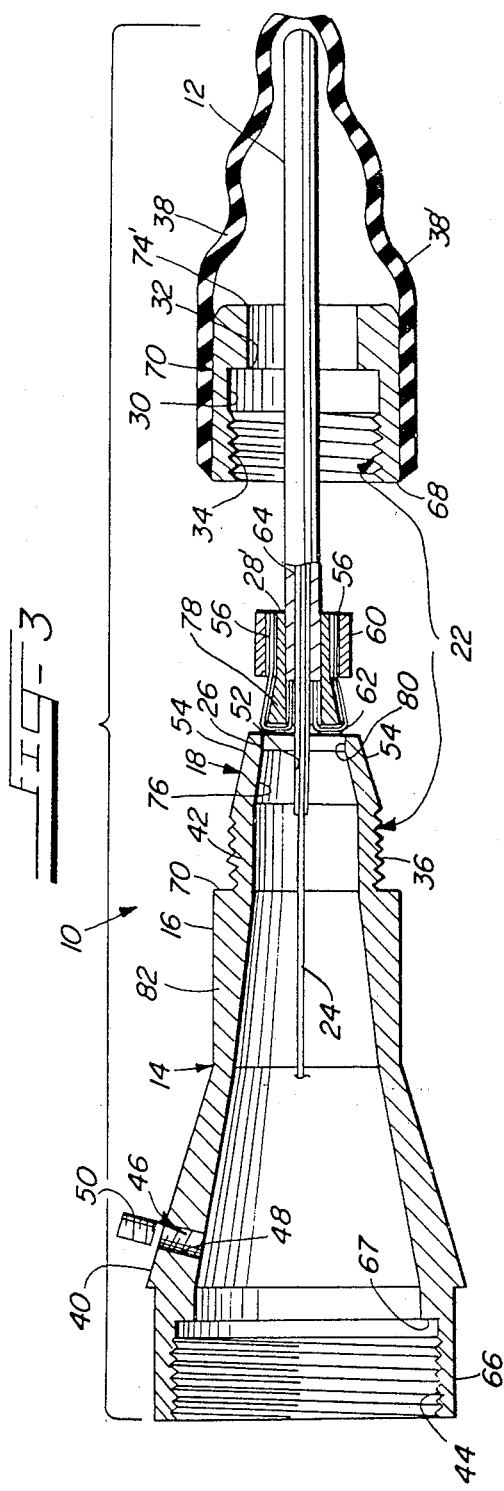
FIG. 3 is a cross-sectional view of another embodiment of the strain relief device constructed in accordance with the present invention with the various structural elements disassembled for clarity.

In the illustration given and with reference first to FIG. 1, the reference numeral 10 designates generally a device for providing strain relief for a cable 12 extending into a connector (not shown). The strain relief device 10 includes a body 14 having a cable receiving opening 16 extending therethrough and having means 18 for securing the cable 12 substantially about the periphery thereof. The cable securing means 18 restrains the cable 12 against rearward movement and is movable from an inoperative position (as shown in FIG. 1) to an operative position (not shown). The device 10 further includes means 20 for moving the securing means 18 from the inoperative position to the operative position and means 22 independent of the securing means 18 for maintaining the securing means 18 in the operative position. With these features of construction, the device 10 is particularly well suited for providing strain relief for a fiber optic cable (such as 12) having an optical fiber 24 terminated in a fiber optic connector (not shown).

Referring to FIG. 1 in greater detail, the securing means 18 can include a plurality of fingers 26 extending rearwardly relative to the body 14 to cooperate with a cable engaging retaining ring 28 and the moving means 20 includes a sleeve 30 having means 32 for biasing the fingers 26 inwardly. Additionally, the maintaining means 22 can include internal threads 34 in the sleeve 30 and external threads 36 on the body 14 which are threadingly engageable with the internal threads 34 in the sleeve 30 to maintain the securing means 18 in the operative position.

Other features of the preferred embodiment can include means 38 for providing bend relief for the cable 12 rearwardly of the body 14. The bend relief means 38 suitably comprises a resilient member providing longitudinal support for the cable 12. While the resilient bend relief shown is a helical coil spring, it is certainly within the purview of the present invention to utilize other forms of bend relief such as rubber boots and the like.

In a more specific sense, when the device 10 is used for providing strain relief for a fiber optic cable 12 having and optical fiber 24 terminated in a fiber optic connector, the body 14 further includes a forward portion 40 and a rearward portion 42. The rearward portion 42 includes the means 18 for securing the fiber optic cable 12 against rearward movement with the cable securing means 18 being movable between an operative position and an inoperative position. Moreover, the rearward portion 42 of the body 14 and the moving means 20 include the means 22 independent of the cable securing means 18 for maintaining the cable securing means 18 in an operative position.

Still additional features of the strain relief device 10 include the body 14 having means 44 associated with the forward portion 40 thereof for securing the body 14 to a fiber optic connector (not shown). The body securing means 44, in a preferred embodiment, can include threads on the forward portion 40 of the body 14 threadingly engageable with threads on a fiber optic connector. The body 14 also can include in a preferred embodiment, means 46 communicating with the cable receiving opening 16 thereof for inserting a sealant into the body 14 to provide environmental protection. The communicating means 46 is suitably a threaded fill hole 48 through the forward portion 40 of the body 14 and a threaded plug 50 threadingly engageable with the threaded fill hole 48.

As shown in FIG. 1, the cable securing means 18 includes an extending segment of the rearward portion 42 of the body 14 deflectable inwardly toward the fiber optic cable 12. The extending segment includes a plurality of longitudinally extending slots 52 defining a plurality of inwardly deflectable fingers 26. The cable securing means 18, in another sense, comprises an extending segment of the rearward portion 42 of the body 14 having a tapered outer surface 54. The moving means 20 is suitably configured such that the biasing means 32 cooperably engages the tapered outer surface 54 to deflect the extending segment toward the fiber optic cable 12.

In a preferred embodiment, the cable securing means 18 includes an extending tubular segment of the rearward portion 42 of the body 14. The extending tubular segment has a first minimum internal diameter in the inoperative position (see FIG. 1) and a second, smaller minimum internal diameter in the operative position (not shown). The moving means 20 cooperably causes the minimum internal diameter of the extending tubular segment to move between the first diameter and the second diameter.

As already indicated, the extending tubular segment includes a tapered outer surface 54 decreasing in diameter in the rearward direction. The biasing means 32 is cooperably engageable with the tapered outer surface 54 to cause the minimum internal diameter of the extending tubular segment to move between the first diameter and the second diameter. As explained above, the extending tubular segment of the rearward portion 42 of the body 14 includes a plurality of longitudinally extending slots 52 defining the inwardly movable fingers 26. The biasing means 32 comprises a suitable camming surface for moving the fingers 26 between the inoperative position and the operative position by cooperating with the tapered outer surface 54 to cause the minimum internal diameter of the extending tubular segment to move between the first diameter and the second diameter. Of course, the camming surface 32 is an internal surface of a camming member which is, preferably, of uniform diameter with the camming member comprising the moving means 20.

As shown in FIG. 1, the maintaining means 22 includes means 36 associated with the rearward portion 42 of the body 14 forward of the fingers 26 and means 34 associated with the camming member 20 forward of the camming surface 32. The means 36 associated with the rearward portion 42 of the body 14 includes external threads (as previously noted) and the means 34 associated with the camming member 20 includes internal threads (also, as previously noted), the internal threads of the camming member 20 being threadingly engageable with the external threads of the rearward portion 42 of the body 14. It will be appreciated that the camming surface 32 cooperates with the tapered outer surface 54 to cause the minimum internal diameter of the extending tubular segment to move from the first diameter to the second diameter as the camming member 20 is threaded onto the rearward portion 42 of the body 14.

In a more specific embodiment, the device 10 is particularly well suited for providing strain relief for a fiber optic cable 12 having strength members 56 and having an optical fiber 24 terminated in a fiber optic connector (not shown). The body 14 has a cable receiving opening 16 extending therethrough and includes means 18 for securing the fiber optic cable against rearward movement which is movable between an inoperative position and an operative position. Means are provided for gripping the strength members 56 of the fiber optic cable 12. The gripping means cooperates with the cable securing means 18 in the operative position and together provide strain relief for the fiber optic cable 12. Of course, the device 10 once again includes means 20 for moving the cable securing means 18 between the inoperative position and the operative position to accomplish the objective of providing strain relief for the fiber optic cable 12.

Additional details of the device 10 include the cable securing means 18 cooperating with the gripping means in the operative position to restrain the gripping means against rearward movement. The gripping means includes a retaining ring 28 and a crimp ring 60 (see FIG. 2) cooperable so that the strength members 56 can be crimped between the retaining ring 28 and the crimp ring 60. The cable securing means 18, once again, includes a rearwardly extending segment 42 being deflectable inwardly to captivate the gripping means. The rearwardly extending segment 42, once again, includes a plurality of longitudinally extending slots 52 defining a plurality of inwardly deflectable fingers 26 having tapered outer surfaces 54 which can be cooperably engaged by the moving means 20 to deflect the fingers 26 inwardly. The inwardly deflectable fingers 26 define a cylindrical opening 62 in the rearwardly extending segment 42 of the body 14 with the opening 62 having a first diameter in the inoperative position and a second, smaller diameter in the operative position. Of course, the moving means 20, once again, cooperably causes the inwardly deflectable fingers to move such that the diameter of the opening 62 moves between the first diameter and the second diameter.

As will be appreciated from a consideration of the description hereinabove, the problem of providing efficient strain relief and a good environmental seal to protect the optical fibers in a fiber optic cable has been solved by the present invention. The strain relief device 10 is comprised of a minimum of components including, at most, the body 14, the camming member or locking nut 20, the spring bend relief 38, the retaining ring 28, and the crimp ring 60 all of which can be slipped onto the fiber optic cable 12 prior to installing a fiber optic contact or terminating pin assembly on the optical fiber 24. The retaining ring 28 can be pushed up to the end of the outer jacket 64 of the fiber optic cable 12 which has been stripped to appropriate dimensions after a contact or pin assembly has been installed on the optical fiber 24 and inserted through the body 14. The strength member fibers 56 are then fanned out and around the retaining ring 28, the crimp ring 60 is pushed over the strength member fibers 56 and the crimp ring 60 is crimped to capture the strength member fibers 56 between the retaining ring 28 and the crimp ring 60. The retaining ring 28 and crimp ring 60 combination can then be located in the rearward section 42 of the body 14 in the vicinity of the fingers 26. The camming member or locking nut 20 can then be threaded onto the rearward section 42 of the body 14 causing the camming surface 32 to push against the tapered outer surfaces 54 so that the fingers 26 are deflected inwardly to a reduced internal diameter configuration in an operative position. The gripping means comprised of the retaining ring 28 and crimp ring 60 combination will then be captivated within the rear portion 42 of the body 14. Moreover, any force exerted on the fiber optic cable 12 will be transferred directly to the body 14 and not the fiber optic contact or terminating pin assembly or optical fiber terminated in the fiber optic connector.

Referring again to FIG. 1, the body 14 can suitably be constructed of a light metal such as aluminum. This will facilitate manufacture, reduce weight, and provide an environmentally sound material. The forward portion 40 of the body 14 can be provided with flats 66 to aid in threading the body 14 onto the rear of a fiber optic connector. The body 14 is suitably tapered from the area of the flats 66 rearwardly from a diameter approximating the diameter of the rear of the fiber optic connector to a diameter just sufficient to captivate the fiber optic cable 12 in accordance with the concepts of the invention. The forward portion 40 of the body 14 can be provided with an internal stop 67 in the form of a shoulder to limit the threaded engagement of the strain relief device 10 with a fiber optic connector.

Referring to the rearward portion 42 of the body 14, it includes a generally uniform diameter opening 62 in the inoperative position. The diameter of the rearward most point of the rearward portion 42 decreases relative to the remainder of the opening 62 in the rearward portion 42 of the body 14 as the camming member 20 is threaded onto the rearward portion 42 of the body 14 because the camming surface 32 biases or deflects the fingers 26 inwardly. The camming surface 32 is, of course, a reduced diameter portion of the sleeve 30 which, nevertheless, has an internal diameter slightly greater than the external diameter of the rearward portion 42 of the body 14 in its inoperative position at the rearward most point thereof. The camming surface 32 continuously and uniformly deflects the fingers 26 inwardly as the camming member 20 is threaded onto the rearward portion 42 of the body 14. Of course, this will continue until the fingers 26 grip and captivate the gripping means against rearward movement which may suitably occur when the forward end 68 of the camming member 20 contacts a stop or shoulder 70.

Also, the camming member 20 has an annular wall 72 having an opening 74 sized and shaped to receive the fiber optic cable 12. The opening 74 is suitably dimensioned to have a diameter the same as the diameter of the outer jacket 64 of the fiber optic cable 12. The annular wall 72 cooperates with the fingers 26 to restrain rearward movement of the gripping means. With the cooperation of the fingers 26, the gripping means, and the annular wall 72, it has been found that the strain relief device 10 can withstand even strong rearward longitudinal forces applied to a fiber optic cable.

Referring to FIG. 3, another preferred embodiment of the invention is illustrated. The similarities between the embodiments of FIGS. 1 and 3 will be apparent and similar features will not be described for the sake of brevity but will be appreciated by those skilled in the art. In order to expedite understanding of the similarities, common reference numerals have been used in FIGS. 1 and 3 to identify common elements.

The inwardly deflectable fingers 26 have tapered inner surfaces 76 forward of the cylindrical opening 62 which diverge forwardly away from the cylindrical opening. The cylindrical opening 62 is adapted to receive the crimp ring 60 in the inoperative position and at least one of the crimp ring 60 and the retaining ring 28' has a tapered outer surface (such as 78) diverging forwardly away from the cylindrical opening 62 when the entire device has been assembled. The crimp ring 60 is preferably initially uniformly cylindrical in cross section with the retaining ring 28' being uniformly cylindrical in cross section along at least a portion of its length and being at least as long as the crimp ring 60. The retaining ring 28' is preferably uniformly cylindrical in cross section along the portion of its length coextensive with the crimp ring 60 and has a tapered outer surface 78 along the forwardly extending portion thereof diverging forwardly away from the crimp ring 60. With these features of construction, the tapered outer surface 78 of the retaining ring 28' cooperates with the tapered inner surfaces 76 of the fingers 26 and surfaces 80 defining the cylindrical opening 62 cooperate with the crimp ring 60 in the operative position to prevent rearward movement of the crimp ring 60, retaining ring 28' and fiber optic cable 12 relative to the body 14.

Other features of this preferred embodiment can include a cylindrical surface 82 on the outside of the body 14 intermediate the length thereof to aid in manufacturing. It will also be appreciated that the camming member 20 can have an enlarged opening 74' more than sufficient to accommodate any of the wide range of sizes of fiber optic cable 12. This embodiment can also utilize bend relief means 38' in the form of a rubber boot in place of the helical coil spring illustrated in FIG. 1. It will also be appreciated that the enlarged opening 74' can be sized and shaped to accommodate the crimp ring and retaining ring combination should it extend rearwardly of the cylindrical opening 62. Of course, many other variations will no doubt come to the mind of those skilled in the art without departing from the invention.

Referring again to FIGS. 1 and 3, it will be appreciated that the strength member fibers 56 can either be draped rearwardly over the retaining ring and then crimped (as shown in FIG. 1) or can be draped forwardly over the retaining ring and then crimped (as shown in FIG. 3). It will also be appreciated that the relative relationship of the crimp ring 60 and the retaining ring 28 (or 28' in the case of FIG. 3) is the relationship which exists prior to crimping the crimp ring 60 which will, after crimping, closely conform to the retaining ring 28 (or 28') to capture the strength member fibers 56 therebetween. When this has been done, the tapered outer surface 78 of the retaining member 28' in FIG. 3 will clearly cooperate with the tapered inner surfaces 76 of the fingers 26 and the surfaces 80 defining the cylindrical opening 62 will clearly cooperate with the outer surface of the crimp ring 60 in the operative position to prevent rearward movement relative to the body 14.

With the present invention, a strain relief device has been provided which is useful for single or multi-contact connectors in providing efficient strain relief and a good environmental seal to protect a cable. It is particularly well suited in the field of fiber optics although the applications are not so limited. The concept could certainly be applied with equal effectiveness in the area of electrical conductors and possibly still other related fields where a cable requires strain relief. It is fully contemplated that, in the field of fiber optics, the invention is well suited for use with a single fiber optic cable containing single or multiple fibers or with multiple single fiber optic cables by captivating the strength member fibers from each such cable in the retaining ring and crimp ring combination. The concept can also be utilized without the retaining ring and crimp ring combination by merely altering the dimensions of the rearward portion of the body so that the fingers can tightly captivate the fiber optic cable. It will be appreciated that the rear portion of the body with the tapered outer surface and the slots permit it to be deflected so that the retaining ring and crimp ring combination and/or the fiber optic cable can be effectively retained against rearward movement. Accordingly, the present invention successfully accomplishes the objective of providing a strain relief device for a cable extending into a connector, particularly for a fiber optic cable having an optical fiber terminated in a fiber optic connector, and more particularly for a fiber optic cable having strength members and having an optical fiber terminated in a fiber optic connector.

While in the foregoing specification, a detailed description of the invention has been set forth for purposes of illustration, variations of the details herein given may be made by those skilled in the art without departing from the spirit and scope of this invention.

I claim:

1. A device for providing strain relief for a fiber optic cable having an optical fiber terminated in a fiber optic connector, comprising:

a body including a forward portion and a rearward portion, said rearward portion including means for securing said fiber optic cable against rearward movement, said body having a cable receiving opening extending therethrough;

said cable securing means being movable radially between an operative position and an inoperative position;

means for gripping and holding said fiber optic cable independently of said securing means, said gripping means cooperating with said cable securing means in said operative position to provide strain relief for said fiber optic cable; and means for moving said cable securing means between said inoperative position and said operative position, said rearward portion of said body and said moving means including means independent of said cable securing means for maintaining said cable securing means in said operative position cooperating with said gripping means to provide said strain relief for the cable, said moving means having a cable receiving opening extending therethrough.

2. The device of claim 1 wherein said body includes means associated with said forward portion thereof for securing said body to said fiber optic connector.

3. The device of claim 2 wherein said body securing means includes threads on said forward portion of said body threadingly engageable with threads on said fiber optic connector.

4. The device of claim 1 wherein said body includes means communicating with said cable receiving opening thereof for inserting a sealant into said body to provide environmental protection.

5. The device of claim 4 wherein said communicating means includes a threaded fill hole through said forward portion of said body and further includes a threaded plug threadingly engageable with said threaded fill hole.

6. The device of claim 1 wherein said cable securing means includes an extending segment of said rearward portion of said body deflectable inwardly toward said fiber optic cable.

7. The device of claim 6 wherein said extending segment includes a plurality of longitudinally extending slots defining a plurality of inwardly deflectable fingers.

8. The device of claim 1 wherein said cable securing means comprises an extending segment of said rearward portion of said body having a tapered outer surface.

9. The device of claim 8 wherein said moving means is cooperably engageable with said tapered outer surface to deflect said extending segment toward said fiber optic cable.

10. The device of claim 1 wherein said cable securing means includes an extending tubular segment of said rearward portion of said body, said extending tubular segment having a first minimum internal diameter in said inoperative position and having a second, smaller minimum internal diameter in said operative position, said moving means cooperably causing the minimum internal diameter of said extending tubular segment to move between said first diameter and said second diameter.

11. The device of claim 10 wherein said extending tubular segment includes a tapered outer surface decreasing in diameter in the rearward direction, said moving means being cooperably engageable with said tapered outer surface to cause the minimum internal diameter of said extending tubular segment to move between said first diameter and said second diameter.

12. The device of claim 11 wherein said extending tubular segment includes a plurality of longitudinally extending slots defining a plurality of inwardly movable fingers.

13. The device of claim 12 wherein said moving means includes a camming surface for moving said fingers between said inoperative position and said operative position, said camming surface cooperating with said tapered outer surface to cause the minimum internal diameter of said extending tubular segment to move between said first diameter and said second diameter.

14. The device of claim 13 wherein said camming surface is an internal surface of a camming member, said internal surface being of uniform diameter, said camming member comprising said moving means.

15. The device of claim 14 wherein said maintaining means includes means associated with said rearward portion of said body forward of said fingers and means associated with said camming member forward of said camming surface.

16. The device of claim 15 wherein said means associated with said rearward portion of said body includes external threads and said means associated with said camming member includes internal threads, said internal threads of said camming member being threadingly engageable with said external threads of said rearward portion of said body, said camming surface cooperating with said tapered outer surface to cause the minimum internal diameter of said extending tubular segment to move between said first diameter and said second diameter as said camming member is threaded onto said rearward portion of said body.

17. A device for providing strain relief for a fiber optic cable having strength members and having an optical fiber terminated in a fiber optic connector, comprising:

a body including means for securing said fiber optic cable against rearward movement, said body having a cable receiving opening extending therethrough, said cable securing means being movable radially between an inoperative position and an operative position;

means for gripping and holding said strength members of said fiber optic cable independently of said securing means, said gripping means cooperating with said cable securing means in said operative position to provide strain relief for said fiber optic cable; and means for moving said cable securing means between said inoperative position and said operative position cooperating with said gripping means to provide said strain relief for the cable.

18. The device of claim 17 wherein said cable securing means cooperates with said gripping means in said operative position to restrain said gripping means against rearward movement.

19. The device of claim 18 wherein said gripping means includes a retaining ring and a crimp ring, said strength members being crimped between said retaining ring and said crimp ring.

20. The device of claim 19 wherein said cable securing means including a rearwardly extending segment of said body, said rearwardly extending segment being deflectable inwardly to captivate said gripping means.

21. The device of claim 20 wherein said rearwardly extending segment includes a plurality of longitudinally extending slots defining a plurality of inwardly deflectable fingers.

22. The device of claim 21 wherein said fingers have tapered outer surfaces, said moving means being cooperably engageable with said tapered outer surfaces to deflect said fingers inwardly.

23. The device of claim 22 wherein said inwardly deflectable fingers define a cylindrical opening in said rearwardly extending segment of said body, said opening having a first diameter in said inoperative position and having a second, smaller diameter in said operative position, said moving means cooperably causing said inwardly deflectable fingers to move so the diameter of said opening changes from said first diameter to said second diameter.

24. The device of claim 23 wherein said fingers have tapered inner surfaces forward of said cylindrical opening, said tapered inner surfaces diverging forwardly away from said cylindrical opening, said cylindrical opening being adapted to receive said crimp ring in said inoperative position.

25. The device of claim 24 wherein at least one of said crimp ring and said retaining ring has a tapered outer surface diverging forwardly away from said cylindrical opening.

26. The device of claim 25 wherein said crimp ring is initially uniformly cylindrical in cross section, said retaining ring is uniformly cylindrical in cross section along at least a portion of its length, and said retaining ring is at least as long as said crimp ring.

27. The device of claim 26 wherein said retaining ring is uniformly cylindrical in cross section along the portion of its length coextensive with said crimp ring and having a tapered outer surface along said forwardly extending portion thereof, said tapered outer surface of said retaining ring diverging forwardly away from said crimp ring.

28. The device of claim 27 wherein said tapered outer surface of said retaining ring cooperates with said tapered inner surfaces of said fingers, and surfaces defining said cylindrical opening cooperate with said crimp ring in said operative position to prevent rearward movement of said crimp ring, retaining ring and fiber optic cable relative to said body.

29. The device of claim 23 wherein said moving means includes a camming surface for moving said fingers between said inoperative position and said operative position, said camming surface being cooperably engageable with said tapered outer surfaces of said fingers to cause the diameter of said opening to change from said first diameter to said second diameter.

30. The device of claim 29 wherein said camming surface is an internal surface of a camming member, said internal surface being of uniform diameter, said camming member comprising said moving means.

31. The device of claim 30 wherein said body and said moving means include means for maintaining said cable securing means in an operative position.

32. The device of claim 31 wherein said maintaining means includes external threads on said body and internal threads in said camming member, said internal threads of said camming member being threadingly engageable with said external threads of said body, said camming surface cooperating with said tapered outer surfaces to cause said fingers to tightly engage said gripping means.

33. Apparatus for providing strain relief for a fiber optic cable comprising:
   a body including cable securing means defining a cable receiving opening therein, said cable securing means being movable radially between an operative position and an inoperative position to vary the size of said opening;
   means, separate from said body, adapted for independently gripping and holding said fiber optic cable; and
   means for moving said cable securing means from said inoperative position to said operative position to reduce the size of said opening and cause said cable securing means to engage and captivate said cable gripping means and thereby prevent movement of said fiber optic cable in said body.

34. Apparatus in accordance with claim 33 wherein said cable securing means exert a compressive force on said cable gripping means and wherein said cable gripping means comprise means for isolating said fiber optic cable from said compressive force.

35. Apparatus in accordance with claim 34 wherein said fiber optic cable includes an optical fiber and a strength member, said cable gripping means being adapted for crimping to said strength member and including means for preventing damage to said optical fiber during crimping.

36. Apparatus in accordance with claim 35 wherein said cable gripping means include a retaining ring adapted to fit over said fiber optic cable and a crimp ring adapted to fit over said retaining ring in coaxial relation therewith, said strength member being crimped between said crimp ring and said retaining ring, said retaining ring being sufficiently rigid to prevent damage to said optical fiber.

37. Apparatus in accordance with claim 34 wherein said cable securing means comprise a plurality of fingers and said moving means comprise means for deflecting said fingers into engagement with said cable gripping means.

38. Apparatus in accordance with claim 37 wherein said fingers extend axially from said body and have tapered outer surfaces, said moving means including camming means for camming against said tapered outer surfaces to deflect said fingers inwardly radially into engagement with said cable gripping means.

39. Apparatus in accordance with claim 38 wherein said moving means comprise a cap adapted for releasable securement to said body, said cap having an interior shoulder for camming against said tapered outer surfaces as said cap is secured to said body.

* * * * *